United States Patent
Scheer

(10) Patent No.: US 9,661,364 B2
(45) Date of Patent: May 23, 2017

(54) RECOMMENDED MEDIA CONTENT BASED CHANNEL SURFING METHODS AND SYSTEMS

(75) Inventor: Fred C. Scheer, Bradford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 96 days.

(21) Appl. No.: 13/246,416

(22) Filed: Sep. 27, 2011

(65) Prior Publication Data

US 2013/0081084 A1    Mar. 28, 2013

(51) Int. Cl.
| | | |
|---|---|---|
| H04N 21/24 | (2011.01) | |
| H04N 21/25 | (2011.01) | |
| H04N 21/258 | (2011.01) | |
| H04N 21/2668 | (2011.01) | |
| H04N 21/442 | (2011.01) | |
| H04N 21/475 | (2011.01) | |
| H04N 21/482 | (2011.01) | |

(52) U.S. Cl.
CPC ....... *H04N 21/2408* (2013.01); *H04N 21/252* (2013.01); *H04N 21/25891* (2013.01); *H04N 21/2668* (2013.01); *H04N 21/44222* (2013.01); *H04N 21/4756* (2013.01); *H04N 21/4826* (2013.01)

(58) Field of Classification Search
USPC .................................................. 725/42, 46
See application file for complete search history.

(56) References Cited

U.S. PATENT DOCUMENTS

| | | | | |
|---|---|---|---|---|
| 7,330,174 B2* | 2/2008 | du Breuil | .............. | G06F 3/0238 345/107 |
| 8,320,746 B2* | 11/2012 | Barrett | ............... | H04N 7/17318 380/211 |
| 8,516,374 B2* | 8/2013 | Fleischman et al. | ......... | 715/716 |
| 2003/0095156 A1* | 5/2003 | Klein et al. | .................... | 345/864 |
| 2003/0110490 A1* | 6/2003 | Dew | .................. | H04N 5/44513 725/37 |
| 2004/0257259 A1* | 12/2004 | Jindal | .................... | G08C 17/02 341/176 |
| 2005/0144637 A1* | 6/2005 | Shikata | ................. | G06F 3/0482 725/35 |
| 2006/0282851 A1* | 12/2006 | Errico | .................... | G06Q 10/10 725/39 |
| 2006/0282856 A1* | 12/2006 | Errico | ............... | G06F 17/30035 725/46 |
| 2008/0209499 A1* | 8/2008 | Ramesh | ................. | H04H 20/26 725/138 |
| 2010/0275233 A1* | 10/2010 | Soohoo | .............. | H04N 5/44543 725/46 |

(Continued)

*Primary Examiner* — Nathan Flynn
*Assistant Examiner* — Christine Kurien

(57) ABSTRACT

An exemplary method includes a media content presentation system dynamically maintaining a list of recommended media content programs for a user and available by way of a media content access device during a media content presentation session, detecting a channel surfing command provided by the user during the media content presentation session, and directing, in response to the channel surfing command, the media content access device to switch to a channel presenting a recommended media content program included in the list of recommended media content programs. Corresponding methods and systems are also disclosed.

20 Claims, 11 Drawing Sheets

(56) References Cited

U.S. PATENT DOCUMENTS

| | | | |
|---|---|---|---|
| 2011/0055871 A1* | 3/2011 | Bi | H04N 5/44543 |
| | | | 725/43 |
| 2012/0159372 A1* | 6/2012 | Stallings et al. | 715/773 |
| 2012/0284753 A1* | 11/2012 | Roberts | H04N 21/41407 |
| | | | 725/45 |

* cited by examiner

Media Content Recommendation Options

| Selection Rule | What my friends are watching | What friends of friends are watching | Trending Events | User Ratings | Viewing History |
|---|---|---|---|---|---|
| A | ☑ | ☐ | ☐ | ☐ | ☐ |
| B | ☐ | ☑ | ☑ | ☐ | ☐ |
| C | ☐ | ☑ | ☑ | ☑ | ☐ |
| D | ☑ | ☐ | ☐ | ☑ | ☑ |

Fig. 7

RECOMMENDED MEDIA CONTENT BASED CHANNEL SURFING METHODS AND SYSTEMS

BACKGROUND INFORMATION

Channel surfing refers to the practice of scanning through different television channels, radio stations, and/or other media content offerings in order to find media content that may be of interest to a user. For example, a user of a set-top box device may channel surf (e.g., by pressing channel up or down buttons on a remote control) in order to find television programs that the user may be interested in viewing.

However, as media content providers have expanded and continue to expand the media content choices available to users by way of set-top box devices and other types of media content access devices, channel surfing has become less efficient and less effective. For example, a user may have access to hundreds or even thousands of channels by way of a set-top box device, but be interested in only a small fraction of the media content programs offered by way of these channels. Hence, the user may have to channel surf through a relatively large number of channels before finding a media content program in which he or she is interested. Not only is this cumbersome and time-consuming for the user, but it may result in missed viewing opportunities, which, in turn, may lead to reduced revenue for the television network service provider.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 shows an exemplary GUI that may be presented to a user and configured to allow the user to set one or more selection rules that may be used to specify which selection heuristics are used to select media content programs for inclusion in a list of recommended media content programs for the user according to principles described herein.

DETAILED DESCRIPTION OF PREFERRED EMBODIMENTS

Figure 1:
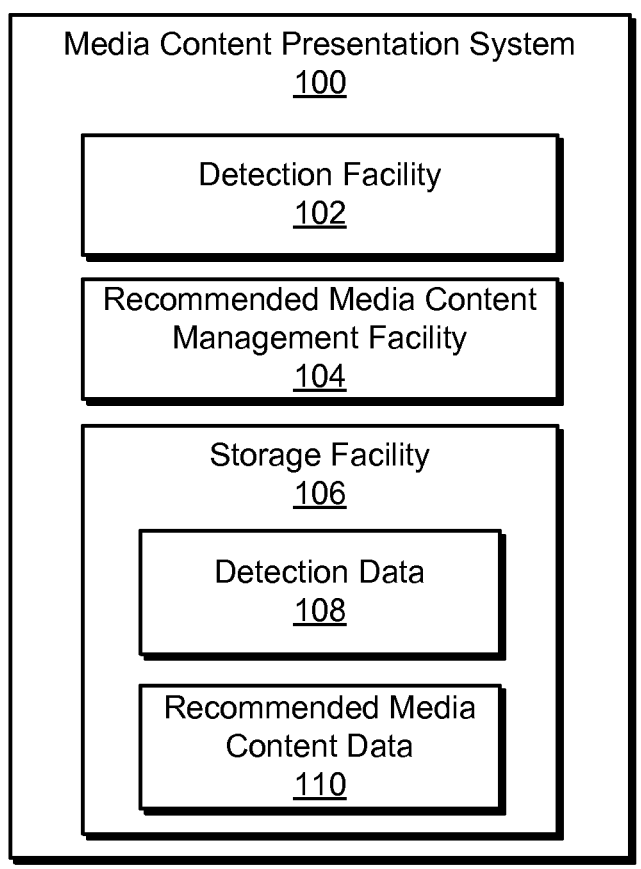
FIG. 1 illustrates an exemplary media content presentation system according to principles described herein.

Recommended media content based channel surfing methods and systems are described herein. As will be described in more detail below, a media content presentation system may dynamically maintain a list of recommended media content programs for a user and available by way of a media content access device (e.g., a set-top box device) during a media content presentation session (e.g., a television program viewing session), detect a channel surfing command provided by the user during the media content presentation session, and direct, in response to the channel surfing command, the media content access device to switch to (e.g., tune to) a channel presenting a recommended media content program included in the list of recommended media content programs. The media content presentation system may similarly direct the media content access device to switch to other channels presenting other recommended media content programs included in the list of recommended media content programs in response to subsequent channel surfing commands provided by the user.

As used herein, a "media content program" refers to any television program, on-demand media program, pay-per-view media program, broadcast media program (e.g., broadcast television program), multicast media program (e.g., multicast television program), narrowcast media program (e.g., narrowcast video-on-demand program), IPTV media content, video, movie, audio program, radio program, or any segment, component, or combination of these or other forms of media content that a user may access by way of a media content access device. A "recommended media content program" refers to a media content program designated by a media content presentation system as being recommended for (i.e., potentially of interest to) a particular user. Various manners in which a media content presentation system may designate a media content program as being recommended for a particular user will be described herein.

By limiting the available channels to which a media content access device may switch (e.g., tune) during a particular media content presentation session to those channels that are carrying (i.e., presenting) recommended media content programs included in a list of recommended media content programs for a particular user, the methods and systems described herein may provide a more efficient and effective channel surfing experience for the user. For example, the methods and systems described herein may allow a user to avoid having to scan through multiple channels carrying media content programs that are of no interest to the user before finding a media content program that is of interest to the user. Moreover, the methods and systems may reduce the time that a user has to spend channel surfing in order to find a media content program in which he or she is interested. This, in turn, allows the user to spend more time actively engaged with a particular media content program, which may lead to increased ratings (e.g., viewing ratings) for the media content program and additional revenue (e.g., advertisement revenue) for the service provider providing the media content program (e.g., a television network service provider).

FIG. 1 illustrates an exemplary media content presentation system 100 (or simply "system 100"). As shown, system 100 may include, without limitation, a detection facility 102, a recommended media content management facility 104 (or simply "management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect one or more channel surfing commands provided by a user of a media content access device ("access device"). The one or more channel surfing commands may be provided by a user in any suitable manner and by way of any suitable user input device communicatively coupled to or a part of the access device. For example, the user may provide the one or more channel surfing commands by way of a remote control device configured to communicate with the access device.

Figure 2:
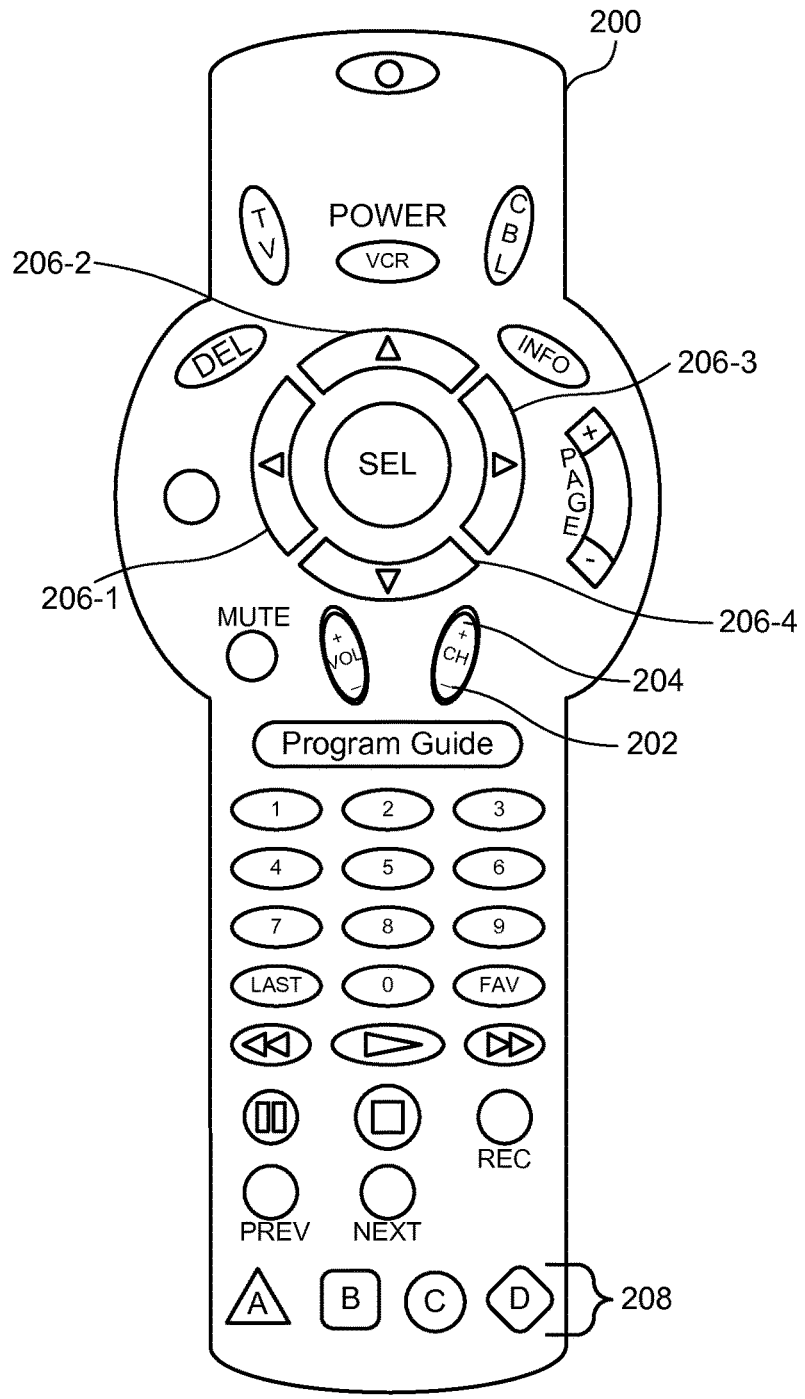
FIG. 2 shows an exemplary remote control device according to principles described herein.

To illustrate, FIG. 2 shows an exemplary remote control device 200 that may be used to provide one or more channel surfing commands. As shown, remote control device 200 may include a variety of buttons, one or more of which may be used to provide channel surfing commands. For example, a user may press channel up and down buttons 202 and 204, one or more of navigational buttons 206-1 through 206-4, and/or any other button as may serve a particular implementation in order to provide the one or more channel surfing commands. In some examples, one or more function buttons 208 (e.g., buttons labeled "A", "B", "C", and "D") may be configured to allow a user to perform specific types of channel surfing operations, as will be described in more detail below.

Figure 3:
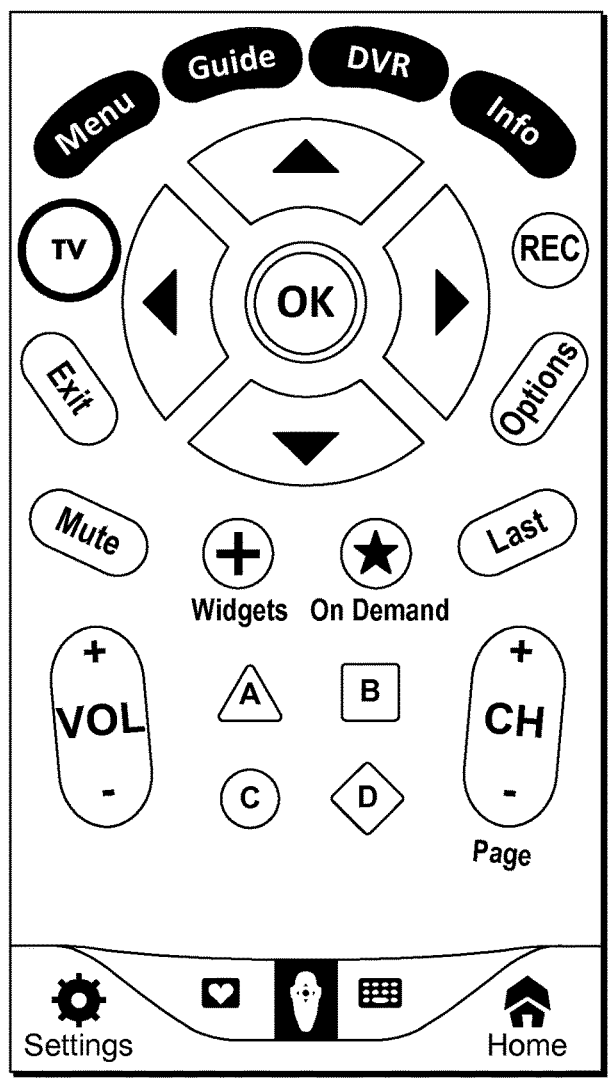
FIG. 3 shows an exemplary remote control device emulation graphical user interface ("GUI") that may be displayed on a display screen of a mobile device configured to emulate a remote control device according to principles described herein.

Remote control device 200 is merely illustrative of one of the many different types of user input devices that may be used to provide channel surfing commands associated with an access device. Other exemplary user input devices include, but are not limited to, a keyboard, a mouse, a touch screen, etc. In some examples, the channel surfing commands may be provided by way of a mobile device (e.g., a mobile phone or a tablet computer) configured to emulate a remote control device. To illustrate, FIG. 3 shows an exemplary remote control device emulation graphical user interface ("GUI") 300 that may be displayed on a display screen of a mobile device configured to emulate a remote control device. As shown, GUI 300 may include various graphical objects representing many of the same user input buttons (e.g., buttons 202-208) that are a part of remote control device 200. A user may interact with (e.g., select) one or more of these graphical objects in order to perform one or more channel surfing commands and/or provide any other type of input configured to control an operation of an access device.

Returning to FIG. 1, management facility 104 may be configured to perform one or more recommended media content management operations. For example, management facility 104 may be configured to dynamically maintain a list of recommended media content programs for a user and available by way of an access device during a media content presentation session. As used herein, a "media content presentation session" refers to a time period during which a user is experiencing (e.g., viewing or listening to) media content by way of an access device. Hence, a media content program that is available during a media content presentation session may be experienced by the user during the media content presentation session if the user so desires.

The list of recommended media content programs may be dynamically maintained in any suitable manner. For example, management facility 104 may dynamically add one or more media content programs to the list of recommended media content programs. To illustrate, management facility 104 may identify one or more media content programs being experienced in real-time by one or more social media contacts of the user during the media content presentation session, one or more media content programs being experienced in real-time during the media content presentation session by one or more people being followed by way of one or more social media services by one or more social media contacts of the user, and/or identify one or more media content programs associated with one or more trending events. Management facility 104 may then dynamically add one or more of the identified media content programs to the list of recommended media content programs. Specific examples of this will be provided below.

Additionally or alternatively, management facility 104 may dynamically add one or more media content programs to the list of recommended media content programs by identifying one or more media content programs experienced by one or more users prior to the media content presentation session (e.g., by analyzing a viewing history of the user and/or one or more social media contacts of the user) and selecting one or more media content programs for inclusion in the list of recommended media content programs based on the one or more identified media content programs. An example of this will also be provided below.

Additionally or alternatively, management facility 104 may dynamically maintain the list of recommended media content programs by dynamically removing one or more media content programs from the list of recommended media content programs. For example, management facility 104 may detect that a media content program included in the list of recommended media content programs is no longer available during the media content presentation session (e.g., the media content program has already aired), and, in response, dynamically remove the media content program from the list of recommended media content programs. As another example, management facility 104 may limit the list of recommended media content programs to include a predetermined number of media content programs. In this case, a media content program may be removed from the list of recommended media content programs if another media content program identified as being relatively more likely to be of interest to the user is selected for inclusion of the list of recommended media content programs. A media content program may be dynamically removed from the list of recommended media content programs for any other reason as may serve a particular implementation.

Additionally or alternatively, management facility 104 may dynamically maintain the list of recommended media content programs by dynamically ranking the recommended media content programs included in the list of recommended media content programs and determining a presentation order of the recommended media content programs (i.e., an order in which the recommended media content programs are presented to the user in response to channel surfing commands provided by the user) based on the ranking of each of the recommended media content programs. The ranking may be performed in accordance with any suitable ranking heuristic. For example, management facility 104 may rank the recommended media content programs based on a popularity of the recommended media content programs among the user's social media contacts, user ratings of the recommended media content programs, user profile information associated with the user and/or one or more social media contacts of the user, metadata associated with the recommended media content programs, and/or any other factor as may serve a particular implementation.

It will be recognized that management facility 104 may dynamically maintain the list of recommended media content programs by performing any other action with respect to the list of recommended media content programs as may serve a particular implementation.

As mentioned, detection facility 102 may detect a channel surfing command provided by a user of an access device during a media content presentation session. In response, management facility 104 may be configured to direct the access device to switch to a channel presenting a recommended media content program included in a list of recommended media content programs for the user. As used herein, a "channel" refers generally to any carrier of media content programs, including, but not limited to, a television channel, a radio channel, a media content stream, an address (e.g., a network address), a frequency (e.g., a radio frequency), or other carrier of media content. Hence, an access device may switch to a channel by tuning to a particular frequency, processing a media content stream, opening a network address, and/or otherwise begin presenting media content carried by the channel.

Management facility 104 may direct the access device to switch to the channel presenting a recommended media content program included in the list of media content programs regardless of the channel to which the access device is tuned or otherwise processing when the channel surfing command is detected by detection facility 102. For example, the access device may be tuned to a first channel presenting a non-recommended media content program (i.e., a media content program not included in the list of recommended media content programs) when a channel surfing command is detected by detection facility 102. In response to the channel surfing command, management facility 104 may direct the access device to switch to a second channel that is presenting a recommended media content program, even though the second channel may or may not be sequentially adjacent to the first channel. Management facility 104 may similarly direct the access device to switch to other channels presenting other recommended media content programs included in the list of recommended media content programs in response to subsequent channel surfing commands provided by the user.

Management facility 104 may be further configured to present the list of recommended media content programs within a user interface (e.g., within a program guide GUI). In this manner, the user may view the names of the media content programs included within the list of recommended media content programs and direct the access device to perform one or more media content processing operations (e.g., view, record, etc.) with respect to any of the media content programs. As will be described below, management facility 104 may dynamically update in real-time the list of recommended media content programs within the user interface as the contents of the list of recommended media content programs change over time.

As mentioned, a list of recommended media content programs for a user may be based on social media activity associated with one or more social media contacts of the user. Such social media activity may include one or more social media posts (e.g., Twitter posts, Facebook posts), social media messages, Facebook "likes," and/or any other type of social media activity performed by one or more social media contacts of the user (e.g., social media friends, people "followed" by the user on one or more social media services, etc.). Hence, in some examples, management facility 104 may detect social media activity associated with one or more social media contacts of the user. Based on the detected social media activity, management facility 104 may dynamically select a plurality of media content programs available by way of an access device associated with the user during a media content presentation session for inclusion in a list of recommended media content programs for the user and allow the access device to only switch to channels presenting the recommended media content programs in response to one or more channel surfing commands provided by the user during the media content presentation session.

Storage facility 106 may be configured to maintain detection data 108 and recommended media content data 110. Detection data 108 may be generated and/or used by detection facility 102. Recommended media content data 110 may be representative of one or more recommended media content programs. It will be recognized that storage facility 106 may maintain additional or alternative data as may serve a particular implementation.

Figure 4:
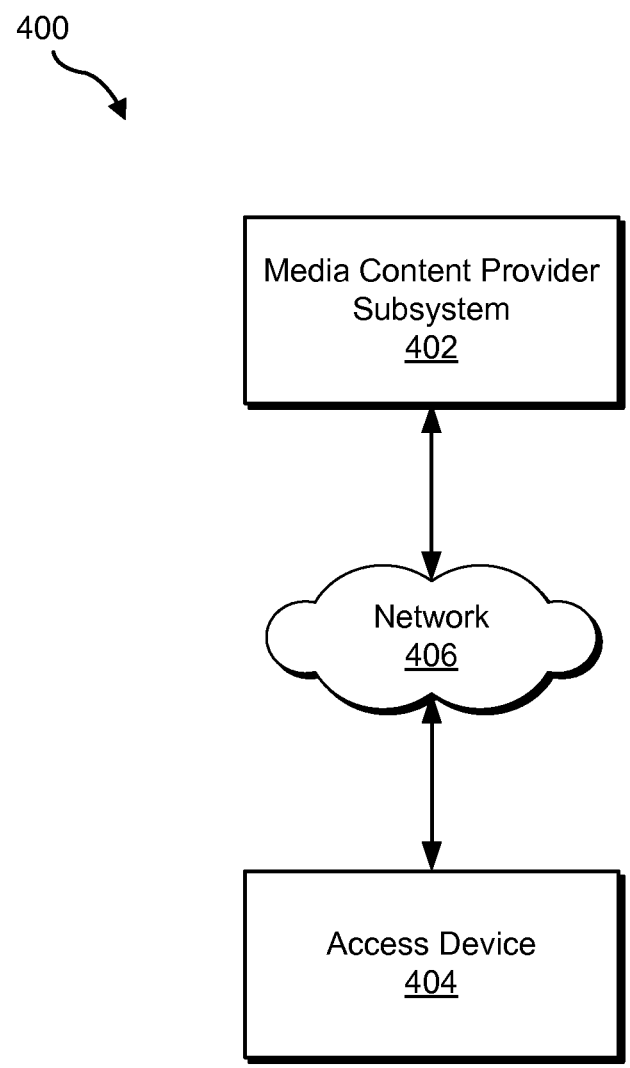
FIG. 4 illustrates an exemplary implementation of the system of FIG. 1 according to principles described herein.

FIG. 4 illustrates an exemplary implementation 400 of system 100 wherein a media content provider subsystem 402 is communicatively coupled to an access device 404 by way of a network 406. As will be described in more detail below, detection facility 102, access management facility 104, and storage facility 106 may each be implemented by media content provider subsystem 402 and/or access device 404.

Media content provider subsystem 402 may be associated with a service provider (e.g., a subscriber television service provider, an Internet service provider, etc.), a media content program provider (e.g., ESPN, NBC, etc.), and/or any other type of media content provider. Accordingly, media content provider subsystem 402 may be configured to provide one or more media content services (e.g., television services, video-on-demand services, Internet services, application services, etc.) to access device 404. For example, media content provider subsystem 402 may be configured to manage (e.g., maintain, process, distribute, and/or generate) media content (e.g., media content programs, advertisements, etc.) configured to be delivered to access device 404. Media content provider subsystem 402 may be implemented by one or more computing devices as may serve a particular implementation.

Additionally or alternatively, media content provider subsystem 402 may be implemented by one or more third party servers configured to manage recommended media content, interface with one or more social media service provider subsystems, and/or perform any other operation associated with the methods and systems described herein.

Access device 404 may facilitate access by a user to content (e.g., media content programs) provided by media content provider subsystem 402. For example, access device 404 may be configured to perform one or more access events at the direction of a user. To illustrate, access device 404 may present and/or record a media content program at the direction of a user.

Access device 404 may be implemented by any suitable combination of media content processing or computing devices ("processing devices"). For example, access device 404 may be implemented by one or more set-top box devices, DVR devices, personal computers, mobile devices (e.g., mobile phones and/or tablet computers), personal-digital assistant devices, gaming devices, television devices, etc.

Media content provider subsystem 402 and access device 404 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 402 and access device 404 may communicate using any suitable network. For example, as shown in FIG. 4, media content provider subsystem 402 and access device 404 may be configured to communicate with each other by way of network 406. Network 406 may include one or more networks or types of networks capable of carrying communications and/or data signals between media content provider subsystem 402 and access device 404. For example, network 406 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 402 or by access device 404. In other embodiments, components of system 100 may be distributed across media content provider subsystem 402 and access device 404.

Figure 5:
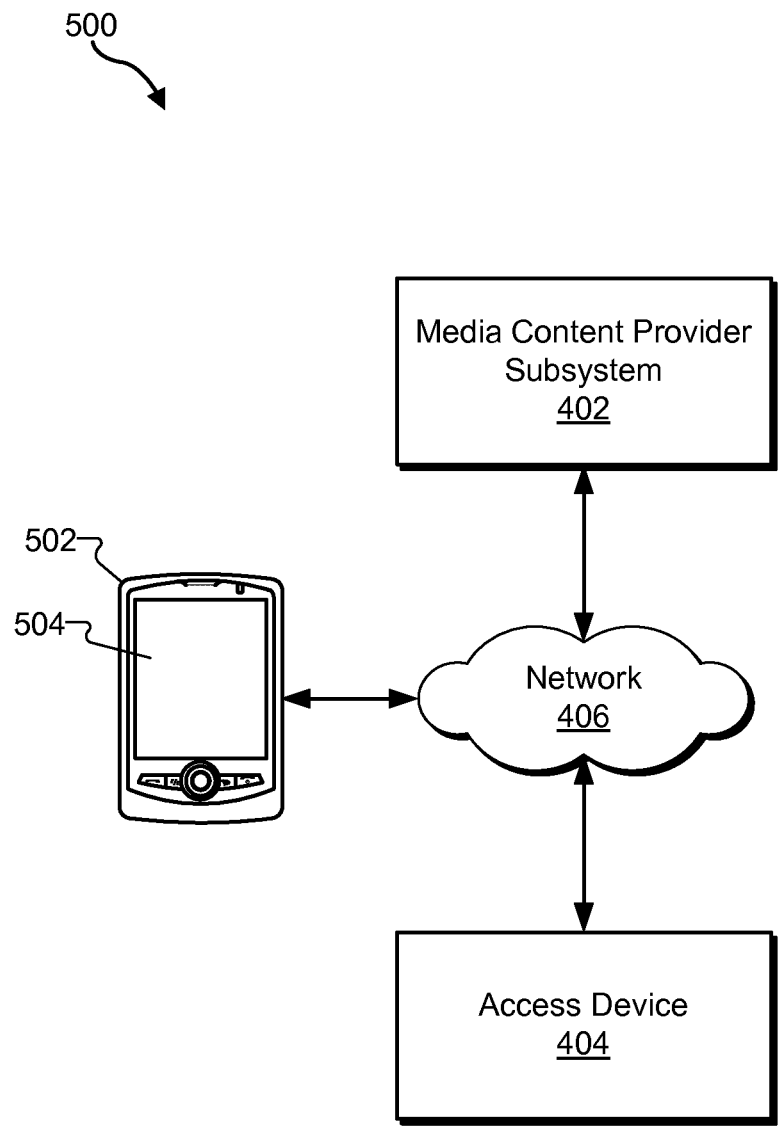
FIG. 5 illustrates another exemplary implementation of the system of FIG. 1 according to principles described herein.

FIG. 5 illustrates another exemplary implementation 500 of system 100. Implementation 500 is similar to implementation 400 in that it includes media content provider subsystem 402 and access device 404 configured to communicate by way of network 406. However, implementation 500 further includes a mobile device 502 configured to emulate a remote control device (e.g., by displaying GUI 300 within display screen 504) associated with access device 404. As shown, mobile device 502 may communicate with access device 404 by way of network 406 (e.g., by way of a home Wi-Fi network or the like), and may utilize any suitable communication technologies, devices, media, and protocols supportive of data communications.

Figure 6:
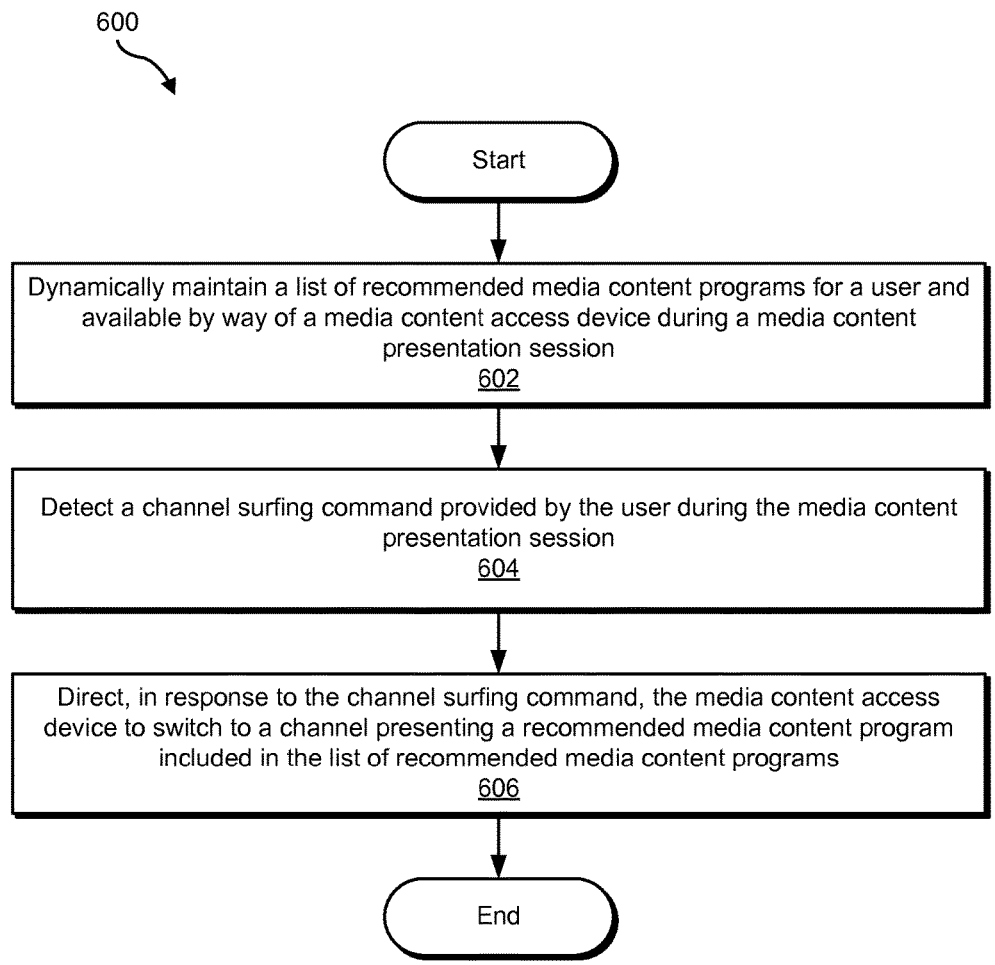
FIG. 6 illustrates an exemplary recommended media content based channel surfing method according to principles described herein.

FIG. 6 illustrates an exemplary recommended media content based channel surfing method 600. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a media content presentation system dynamically maintains a list of recommended media content programs for a user and available by way of a media content access device during a media content presentation session. Step 602 may be performed in any of the ways described herein.

In step 604, the media content presentation system detects a channel surfing command provided by the user during the media content presentation session. Step 604 may be performed in any of the ways described herein.

In step 606, the media content presentation system directs, in response to the channel surfing command, the media content access device to switch to a channel presenting a recommended media content program included in the list of recommended media content programs. Step 606 may be performed in any of the ways described herein.

Various examples of system 100 dynamically maintaining a list of recommended media content programs for a user and available by way of a media content access device associated with the user will now be described. It will be recognized that the examples provided herein are merely illustrative of the many different examples that may be realized in connection with the methods and systems described herein.

As mentioned, system 100 may identify media content programs being experienced in real-time by social media contacts of the user during the media content presentation session and dynamically add the media content programs to the list of recommended media content programs. The media content programs being experienced in real-time by social media contacts of the user during the media content presentation session may be identified in any suitable manner. For example, system 100 may identify keywords included in one or more social media posts made by the social media contacts and identify the media content programs based on the identified keywords.

To illustrate, a social media contact of the user (e.g., a person whom the user is following on Twitter or a person whom the user is friends with on Facebook or any other social media website) may make a social media post (e.g., a Tweet or a Facebook post) that he or she is watching a particular media content program (e.g., a media content program entitled "Survivor"). System 100 may analyze the social media post and determine that it includes one or more keywords (e.g., one or more words marked with a hashtag or the like) associated with the media content program. Such words may include words included in the title of the media content program, words descriptive of one or more people associated with the media content program, and/or any other word associated with the media content program. For example, the social media post may include the following: "Watching #Survivor right now . . . awesome episode!" System 100 may use one or more of these words and symbols to determine that the social media contact is watching a media content program entitled "Survivor."

Additionally or alternatively, system 100 may identify one or more media content programs being experienced in real-time by social media contacts of the user during the media content presentation session by receiving log data representative of one or more presentation actions performed by one or more access devices associated with the one or more social media contacts and identifying the one or more media content programs based on the log data.

To illustrate, system 100 may receive log data from a service provider that indicates that an access device associated with a social media contact of the user is tuned to a particular channel carrying a particular media content program. Based on the log data, system 100 may determine that the social media contact is experiencing the media content program.

System 100 may determine whether to dynamically add a media content program identified as being experienced in real-time by one or more social media contacts of the user to the list of recommended media content programs for the user in any suitable manner. For example, system 100 may perform further analysis of the social media post provided by the social media contact to determine whether the social media contact actually likes the media content program. For example, referring again to the "Survivor" social media post provided above, system 100 may detect the word "awesome" and the exclamation point and determine that the social media content likes the media content program and that he or she would recommend it to his or her friends. Based on this information, system 100 may add the media content program entitled "Survivor" to the list of recommended media content programs.

Alternatively, the social media post may indicate that a social media contact of the user does not like and therefore would not recommend a particular media content program that he or she is experiencing. For example, a social media contact of the user may make the following social media post: "Watching #Desperate Housewives" with my wife . . . can't believe they actually air this trash." Based on the contents of this social media post, system 100 may determine that the social media contact does not like a media content program entitled "Desperate Housewives" and accordingly determine that it should not be added to the list of recommended media content programs for the user.

In some examples, a media content program may be added to a list of recommended media content programs for a user if system 100 determines that a predefined number or percentage of social media contacts of the user are experiencing the media content program. For example, system 100 may determine that a certain percentage of the user's social media contacts are watching a broadcast of a sporting event and accordingly include the broadcast of the sporting event in the list of recommended media content programs for the user. As another example, system 100 may determine that a social media contact particularly close to the user (e.g., related to the user or designated as a "best friend" of the user) is watching a particular media content program and accordingly include the media content program in the list of recommended media content programs for the user.

Additionally or alternatively, system 100 may dynamically maintain a list of recommended media content programs for a user and available by way of an access device associated with the user during a media content presentation session by identifying one or more media content programs being experienced in real-time during the media content presentation session by one or more people being followed by way of one or more social media services by the one or more social media contacts of the user and dynamically adding the one or more media content programs being experienced by the one or more people to the list of recommended media content programs. To illustrate, a user may have a social media contact (e.g., a social media friend) who is "friends" with or who follows a particular person by way of a social media service (e.g., Twitter or Facebook). System 100 may identify a media content program being experienced by the person and then determine whether to include the media content program in the list of recommended media content programs for the user in any of the ways described herein.

Additionally or alternatively, system 100 may dynamically maintain a list of recommended media content programs for a user and available by way of an access device associated with the user during a media content presentation session by identifying one or more trending events during the media content presentation session, identifying one or more media content programs available by way of the access device during the media content presentation session that are associated with the one or more trending events, and dynamically adding the one or more media content programs to the list of recommended media content programs. As used herein, a "trending event" refers to an event (e.g., a news event, a sporting event, a social event, a programming event, and/or any other type of event) that may be the subject of or otherwise referred to in one or more media content programs.

System 100 may identify a trending event in any suitable manner as may serve a particular implementation. For example, system 100 may access trend data associated with one or more social media services and determine that a particular event is trending upwards (i.e., becoming more popular). To illustrate, a particular football game may trend upwards immediately prior to and/or during an actual occurrence of the football game (i.e., there may be a spike in social media posts about the football game immediately prior to and/or during the football game). Based on this trend, system 100 may identify a media content program associated with the football game (e.g., a broadcast of the football game) and add the media content program to the list of recommended media content programs for the user.

It will be recognized that trending events may be identified in any other suitable manner. For example, system 100 may identify a trending event based on news feeds, user input, metadata associated with one or more media content programs, and/or any other data as may serve a particular implementation.

Additionally or alternatively, system 100 may dynamically maintain a list of recommended media content programs for a user and available by way of an access device associated with the user during a media content presentation session by selecting one or more media content programs for inclusion in the list of recommended media content programs based on one or more user ratings of the one or more media content programs. For example, one or more social media contacts of the user and/or any other user may rate a particular media content program in any suitable manner. System 100 may access the ratings information and select one or more media content programs for inclusion in the list of recommended media content programs based on the ratings information.

Additionally or alternatively, system 100 may dynamically maintain a list of recommended media content programs for a user and available by way of an access device associated with the user during a media content presentation session by identifying one or more media content programs experienced by one or more users prior to the media content presentation session and selecting one or more media content programs for inclusion in the list of recommended media content programs based on the identified one or more media content programs experienced by the one or more users prior to the media content presentation session.

For example, system 100 may maintain a viewing history log representative of media content programs watched by the user prior to the media content session. System 100 may then identify one or more media content programs available during the media content session that have metadata matching or similar to metadata associated with the previously watched media content programs. In this manner, media content programs similar in type, genre, etc. to those already watched by the user may be selected for inclusion in the list of recommended media content programs for the user.

Viewing history log data associated with one or more social media contacts of the user and/or of any other user may be used in a similar manner to select media content programs for inclusion in the list of recommended media content programs for the user.

Additionally or alternatively, system 100 may dynamically maintain a list of recommended media content programs for a user and available by way of an access device associated with the user during a media content presentation session by selecting one or more media content programs for inclusion in the list of recommended media content programs for the user in accordance with a user profile associated with the user and/or one or more other users (e.g., one or more social media contacts of the user). For example, a user profile associated with a particular user may indicate that the user is male, twenty-one years old, and often watches NASCAR racing. System 100 may use this information to select one or more media content programs associated with car racing for inclusion in a list of recommended media content programs for the user.

The above-described ways in which media content programs may be selected for inclusion in a list of recommended media content programs for a user may be referred to "selection heuristics." System 100 may be configured to use a combination of any of the selection heuristics described herein to select media content programs for inclusion in a list of recommended media content programs for a user. In some examples, system 100 may allow a user to specify which selection heuristics are used to select media content programs for inclusion in a list of recommended media content programs for the user.

For example, FIG. 7 shows an exemplary GUI 700 that may be presented to the user and configured to allow the user to set one or more selection rules (i.e., media content selection rules) that may be used to specify which selection heuristics are used to select media content programs for inclusion in a list of recommended media content programs for the user. As shown, the user has specified a first selection rule (i.e., selection rule "A") to be based on what the user's friends are watching, a second selection rule (i.e., selection rule "B") to be based on what friends of friends are watching and on trending events, a third selection rule (i.e., selection rule "C") to be based on what friends of friends are watching, trending events, and user ratings, and a fourth selection rule (i.e., selection rule "D") to be based on what the user's friends are watching, user ratings, and a viewing history associated with the user.

In some examples, each of these selection rules may be associated with a function button (e.g., one of function buttons 208) that is a part of a remote control device configured to control an operation of an access device. To illustrate, selection rule "A" may be associated with the function button labeled "A" in FIGS. 2 and 3. In this manner, the user may simply press the function button labeled "A" to direct system 100 to utilize selection rule "A" when selecting media content programs to be included in list of the recommended media content programs.

Figure 8:
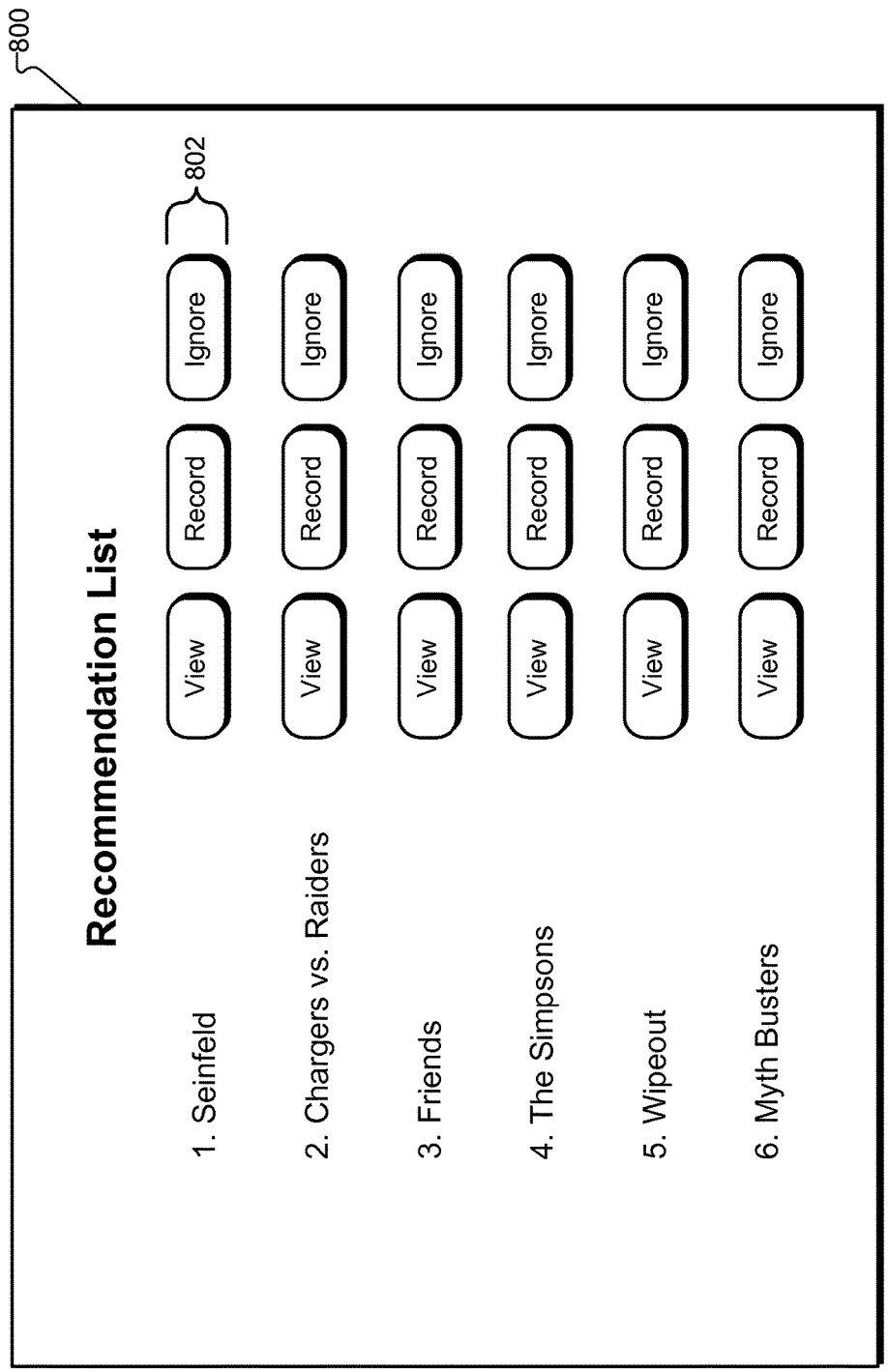
FIG. 8 shows an exemplary GUI in which a list of recommended media content programs for a user is presented according to principles described herein.

As mentioned, system 100 may be configured to present a list of recommended media content programs for a user within a user interface. For example, FIG. 8 shows an exemplary GUI 800 in which a list of recommended media content programs for a user is presented. As shown, one or more media content processing options (e.g., options 802) may be presented within GUI 800 together with each recommended media content program. For example, a user may select one or more of options 802 to view, record, or ignore the first listed media content program (i.e., "Seinfeld").

In some examples, a presentation order of the list of recommended media content programs presented in GUI 800 may be based on a relative ranking of each media content program in the list. For example, in the particular example of FIG. 8, the media content program named "Seinfeld" is the highest ranked media content program and the media content program named "Myth Busters" is the lowest ranked media content program. As described above, the ranking of each media content program may be based on any suitable ranking heuristic and/or factor as may serve a particular implementation.

Figure 9:
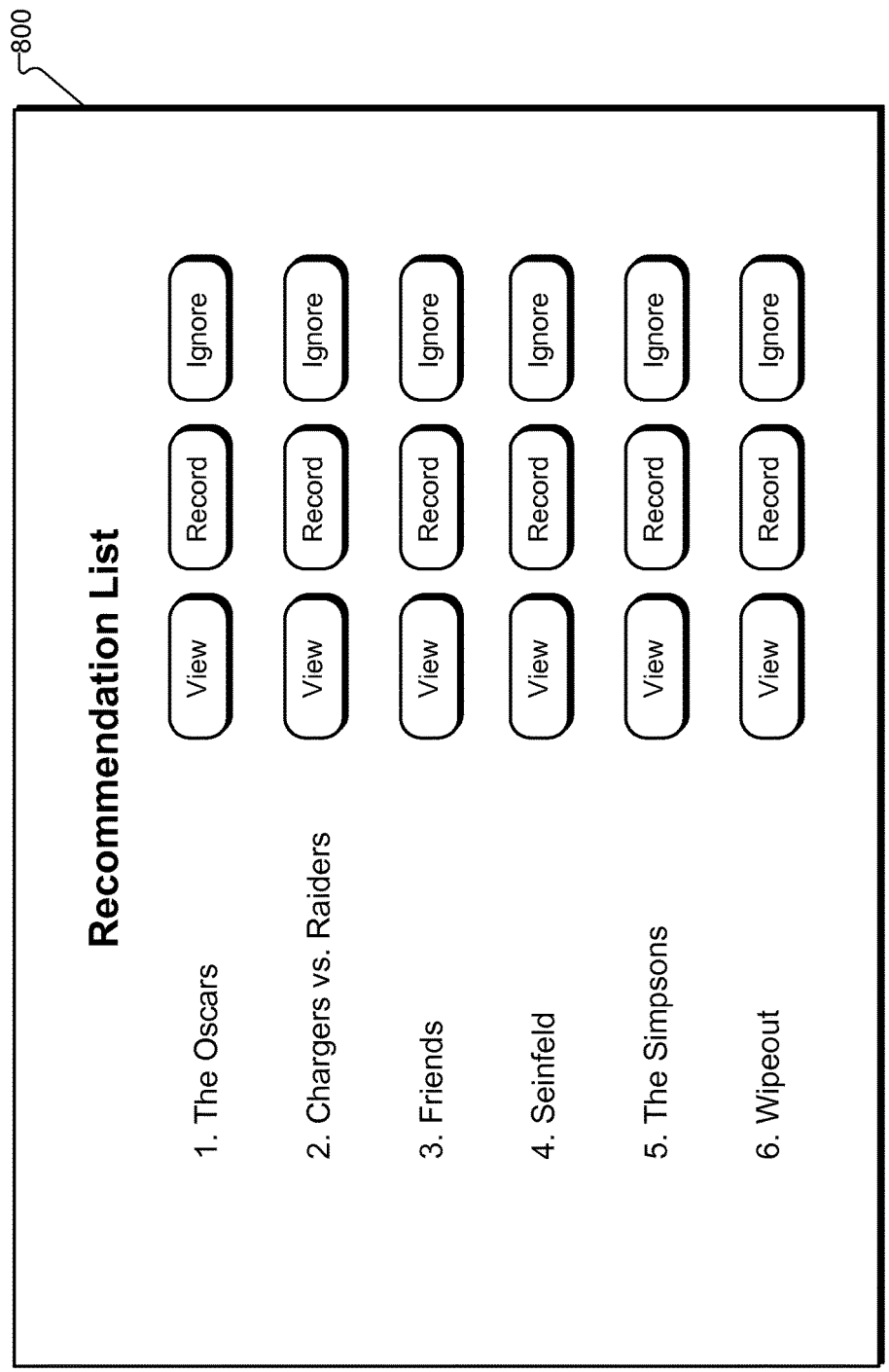
FIG. 9 shows the GUI of FIG. 8 after the list of recommended media content programs has been updated according to principles described herein.

In some examples, the list of recommended media content programs presented in GUI 800 may be dynamically updated in real-time as the contents and/or order of the list of recommended media content programs change over time. For example, FIG. 9 shows GUI 800 after the list of recommended media content programs has been updated. As shown, both the contents and order of the list of recommended media content programs have been updated.

Figure 10:
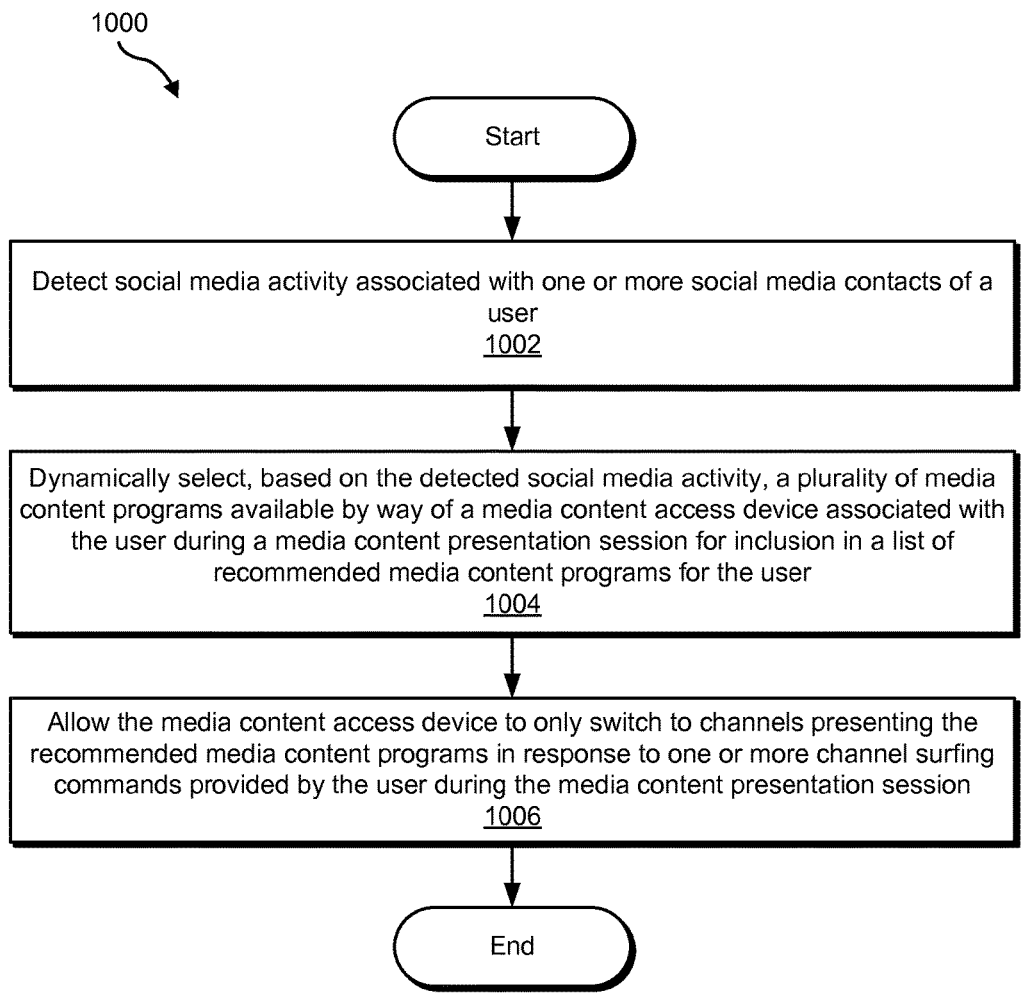
FIG. 10 illustrates another exemplary recommended media content based channel surfing method according to principles described herein.

FIG. 10 illustrates another exemplary recommended media content based channel surfing method 1000. While FIG. 10 illustrates exemplary steps according to one embodiment, other embodiments may omit, add to, reorder, and/or modify any of the steps shown in FIG. 10. One or more of the steps shown in FIG. 10 may be performed by system 100 and/or any implementation thereof.

In step 1002, a media content presentation system detects social media activity associated with one or more social media contacts of a user. Step 1002 may be performed in any of the ways described herein.

In step 1004, the media content presentation system dynamically selects, based on the detected social media activity, a plurality of media content programs available by way of a media content access device associated with the user during a media content presentation session for inclusion in a list of recommended media content programs for the user. Step 1004 may be performed in any of the ways described herein.

In step 1006, the media content presentation system allows the media content access device to only switch to channels presenting the recommended media content programs in response to one or more channel surfing commands provided by the user during the media content presentation session. Step 1006 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
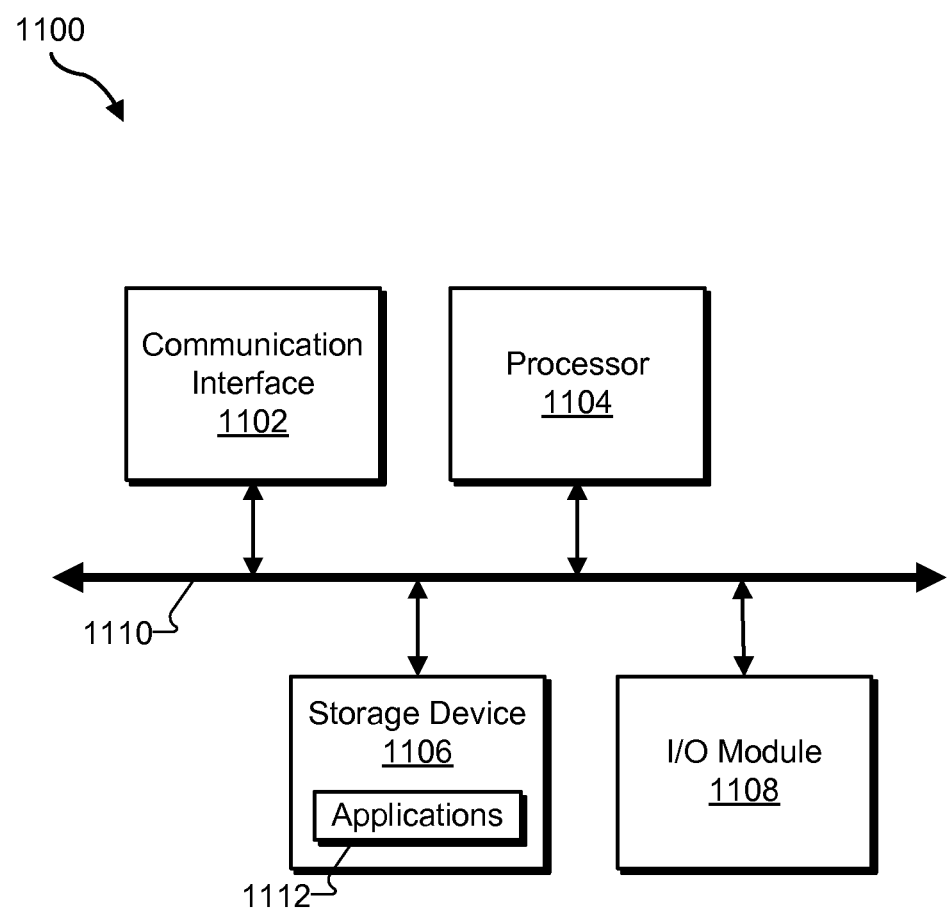
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and/or recommended media content management facility 104. Likewise, storage facility 106 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media content presentation system for presentation to a user, a graphical user interface that displays a plurality of media content recommendation options used to specify which selection heuristics are applied to select media content programs for inclusion in lists of recommended media content programs;
detecting, by the media content presentation system and by way of the graphical user interface, a setting by the user of a plurality of media content selection rules based on the plurality of media content recommendation options;
associating, by the media content presentation system, a first media content selection rule from the plurality of media content selection rules with a first function button selected by the user from a plurality of function buttons;
associating, by the media content presentation system, a second media content selection rule from the plurality of media content selection rules with a second function button selected by the user from the plurality of function buttons;
detecting, by the media content presentation system, a selection by the user of the first function button from the plurality of function buttons;
dynamically selecting, by the media content presentation system in response to the selection of the first function button and based on the first media content selection rule, a first plurality of media content programs for inclusion in a list of recommended media content programs for the user and available by way of a media content access device during a media content presentation session;
detecting, by the media content presentation system, a selection by the user of the second function button from the plurality of function buttons;
dynamically updating, by the media content presentation system in response to the selection of the second function button and based on the second media content selection rule, the list of recommended media content programs with a second plurality of media content programs including at least one media content program not included in the first plurality of media content programs;

dynamically ranking, based at least in part on a popularity of the recommended media content programs among one or more social media contacts of the user, each of the recommended media content programs in the list of recommended media content programs;

determining a presentation order of the recommended media content programs in accordance with the ranking of each of the recommended media content programs, the presentation order representing an order in which the recommended media content programs are presented to the user in response to channel surfing commands provided by the user;

detecting, by the media content presentation system, a channel surfing command provided by the user during the media content presentation session; and directing, by the media content presentation system in response to the channel surfing command, the media content access device to switch, in accordance with the presentation order, to a channel presenting a recommended media content program included in the list of recommended media content programs.

2. The method of claim 1, wherein at least one of the dynamically selecting and the dynamically updating of the list of recommended media content programs for the user comprises:

identifying one or more media content programs being experienced in real-time by the one or more social media contacts of the user during the media content presentation session; and dynamically adding the one or more media content programs to the list of recommended media content programs.

3. The method of claim 2, wherein the identifying of the one or more media content programs being experienced in real-time by the one or more social media contacts of the user during the media content presentation session comprises:

identifying one or more keywords in one or more social media posts made by the one or more social media contacts; and identifying the one or more media content programs based on the identified one or more keywords.

4. The method of claim 2, wherein at least one of the dynamically selecting and the dynamically updating of the list of recommended media content programs for the user further comprises:

identifying one or more media content programs being experienced in real-time during the media content presentation session by one or more people being followed by way of one or more social media services by the one or more social media contacts of the user; and dynamically adding the one or more media content programs being experienced by the one or more people to the list of recommended media content programs.

5. The method of claim 2, wherein the identifying of the one or more media content programs being experienced in real-time by the one or more social media contacts of the user during the media content presentation session comprises:

receiving log data representative of one or more presentation actions performed by one or more media content access devices associated with the one or more social media contacts; and identifying the one or more media content programs based on the log data.

6. The method of claim 1, wherein at least one of the dynamically selecting and the dynamically updating of the list of recommended media content programs for the user comprises:

identifying one or more trending events during the media content presentation session;

identifying one or more media content programs available by way of the media content access device during the media content presentation session that are associated with the one or more trending events; and dynamically adding the one or more media content programs to the list of recommended media content programs.

7. The method of claim 1, wherein at least one of the dynamically selecting and the dynamically updating of the list of recommended media content programs for the user comprises selecting one or more media content programs for inclusion in the list of recommended media content programs based on one or more user ratings of the one or more media content programs.

8. The method of claim 1, wherein at least one of the dynamically selecting and the dynamically updating of the list of recommended media content programs for the user comprises:

identifying one or more media content programs experienced by one or more users prior to the media content presentation session; and selecting one or more media content programs for inclusion in the list of recommended media content programs based on the identified one or more media content programs experienced by the one or more users prior to the media content presentation session.

9. The method of claim 8, wherein the one or more users comprise at least one of the user and at least one of the one or more social media contacts of the user.

10. The method of claim 1, wherein at least one of the dynamically selecting and the dynamically updating of the list of recommended media content programs for the user comprises dynamically removing one or more media content programs from the list of recommended media content programs.

11. The method of claim 1, wherein the directing of the media content access device to switch to the channel presenting the recommended media content program comprises directing the media content access device to switch from a channel presenting a non-recommended media content program to the channel presenting the recommended media content program.

12. The method of claim 1, wherein the directing of the media content access device to switch to the channel presenting the recommended media content program comprises directing the media content access device to switch from a channel that is not sequentially adjacent to the channel presenting the recommended media content program.

13. The method of claim 1, further comprising presenting, by the media content presentation system, the list of recommended media content programs within a user interface.

14. The method of claim 1, wherein the dynamically updating of the list of recommended media content programs is performed in real-time by the media content presentation system.

15. A method comprising:

providing, by a media content presentation system for presentation to a user, a graphical user interface that displays a plurality of media content recommendation options used to specify which selection heuristics are applied to select media content programs for inclusion in lists of recommended media content programs;

detecting, by the media content presentation system and by way of the graphical user interface, a setting by the user of a plurality of media content selection rules based on the plurality of media content recommendation options, the media content selection rules based on social media activity associated with one or more social media contacts of the user;

associating, by the media content presentation system, a first media content selection rule from the plurality of media content selection rules with a first function button selected by the user from a plurality of function buttons;

associating, by the media content presentation system, a second media content selection rule from the plurality of media content selection rules with a second function button selected by the user from the plurality of function buttons;

detecting, by the media content presentation system, social media activity associated with at least one of the one or more social media contacts of the user;

detecting, by the media content presentation system, a selection by the user of the first function button from the plurality of function buttons;

dynamically selecting, by the media content presentation system in response to the selection of the first function button and based on the first media content selection rule and the detected social media activity, a first plurality of media content programs available by way of a media content access device associated with the user to be included in a list of recommended media content programs for the user;

detecting, by the media content presentation system, a selection by the user of the second function button from the plurality of function buttons;

dynamically updating, by the media content presentation system in response to the selection of the second function button and based on the second media content selection rule and the detected social media activity, the list of recommended media content programs with a second plurality of media content programs including at least one media content program not included in the first plurality of media content programs;

dynamically ranking, based at least in part on a popularity of the recommended media content programs among one or more social media contacts of the user, each of the recommended media content programs in the list of recommended media content programs;

determining a presentation order of the recommended media content programs in accordance with the ranking of each of the recommended media content programs, the presentation order representing an order in which the recommended media content programs are presented to the user in response to channel surfing commands provided by the user;

detecting, by the media content presentation system, one or more pressings of a channel up button or a channel down button on a remote control device by the user during a media content presentation session in which a graphical program guide is not presented to the user; and allowing, by the media content presentation system, the media content access device to only switch, in accordance with the presentation order, to channels presenting the recommended media content programs included in the list of recommended media content programs in response to the one or more pressings of the channel up button or the channel down button.

16. A system comprising:

a detection facility that detects, by way of a graphical user interface provided for presentation to a user, a setting by the user of a plurality of media content selection rules based on a plurality of media content recommendation options used to specify which selection heuristics are applied to select media content programs for inclusion in lists of recommended media content programs, wherein the graphical user interface displays the plurality of media content recommendation options to the user;

a recommended media content management facility communicatively coupled to the detection facility and that
associates a first media content selection rule from the plurality of media content selection rules with a first function button selected by the user from a plurality of function buttons, and
associates a second media content selection rule from the plurality of media content selection rules with a second function button selected by the user from the plurality of function buttons;

wherein the detection facility further detects a selection by the user of the first function button from the plurality of function buttons;

wherein the recommended media content management facility
dynamically selects, in response to the selection of the first function button and based on the first media content selection rule, a first plurality of media content programs for inclusion in a list of recommended media content programs for the user and available by way of a media content access device during a media content presentation session;
detects a selection by the user of the second function button from the plurality of function buttons;
dynamically updates, in response to the selection of the second function button and based on the second media content selection rule, the list of recommended media content programs with a second plurality of media content programs including at least one media content program not included in the first plurality of media content programs;
dynamically ranks, based at least in part on a popularity of the recommended media content programs among one or more social media contacts of the user, each of the recommended media content programs in the list of recommended media content programs; and
determines a presentation order of the recommended media content programs in accordance with the ranking of each of the recommended media content programs, the presentation order representing an order in which the recommended media content programs are presented to the user in response to channel surfing commands provided by the user;

wherein the detection facility further detects a channel surfing command provided by the user during the media content presentation session; and wherein the recommended media content management facility further directs the media content access device to switch, in accordance with the presentation order, to a channel presenting a recommended media content program included in the list of recommended media content programs in response to the channel surfing command.

17. The method of claim 1, further comprising:
detecting, by the media content presentation system, an additional channel surfing command provided by the user during the media content presentation session and subsequent to the detecting of the selection of the second function button; and
directing, by the media content presentation system in response to the additional channel surfing command, the media content access device to switch to a channel presenting a recommended media content program included in the second plurality of media content programs included within the updated list of recommended media content programs.

18. The method of claim 1, wherein the dynamically ranking of each of the recommended media content programs in the list of recommended media content programs comprises dynamically ranking, based at least in part on user profile information associated with the user or the one or more social media contacts of the user, each of the recommended media content programs in the list of recommended media content programs.

19. The method of claim 1, wherein the dynamically ranking of each of the recommended media content programs in the list of recommended media content programs comprises dynamically ranking, based at least in part on user ratings by the one or more social media contacts of the user, each of the recommended media content programs in the list of recommended media content programs.

20. The method of claim 15, wherein the dynamically ranking is further based at least in part on user ratings by the one or more social media contacts of the user.

* * * * *